United States Patent [19]

Wardlaw, III et al.

[11] E Patent Number: Re. 33,656

[45] Reissued Date of Patent: Aug. 6, 1991

[54] DOWNHOLE CEMENTING TOOL ASSEMBLY

[76] Inventors: Louis J. Wardlaw, III, P.O. Box 219061, Houston, Tex. 77218; Joe A. Young, 100 Bastrap St., Lafayette, La. 70583

[21] Appl. No.: 451,519

[22] Filed: Dec. 6, 1989

Related U.S. Patent Documents

Reissue of:

[64] Patent No.: 4,711,300
Issued: Dec. 8, 1987
Appl. No.: 863,239
Filed: May 14, 1986

[51] Int. Cl.[5] ..... E21B 33/16

[52] U.S. Cl. ..... 166/153; 166/193

[58] Field of Search ..... 166/153–156, 166/179, 192, 193, 195, 202, 203, 291

[56] References Cited

U.S. PATENT DOCUMENTS

| | | | |
|---|---|---|---|
| 2,165,433 | 7/1939 | Wickersham | 166/153 |
| 3,550,683 | 12/1970 | Comeaux | 166/156 |
| 4,175,619 | 11/1979 | Davis | 166/153 X |
| 4,190,111 | 2/1980 | Davis | 166/153 X |
| 4,190,112 | 2/1980 | Davis | 166/153 X |
| 4,548,271 | 10/1985 | Keller | 166/291 |
| 4,836,279 | 6/1989 | Freeman | 166/153 |
| 4,858,687 | 8/1989 | Watson et al. | 166/153 |

*Primary Examiner*—Bruce M. Kisliuk
*Assistant Examiner*—David J. Bagnell
*Attorney, Agent, or Firm*—Jackson & Walker

[57] ABSTRACT

A cementing tool assembly comprises a float collar, a cementing plug, and a wiper plug having interconnecting locking ends. The cementing tool assembly is non rotatable in the casing and includes internal frangible cutters which are breakable in compression to aid the shredding of the cementing tool assembly upon completion of the cementing operation.

9 Claims, 2 Drawing Sheets

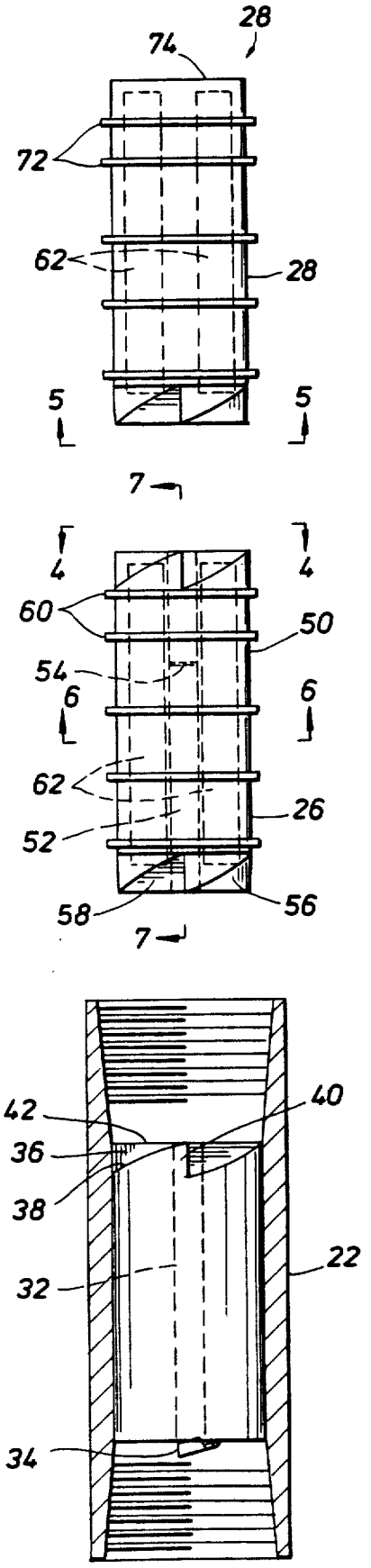
FIG. 3
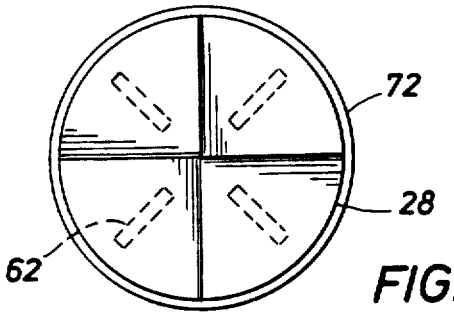
FIG. 5
FIG. 4
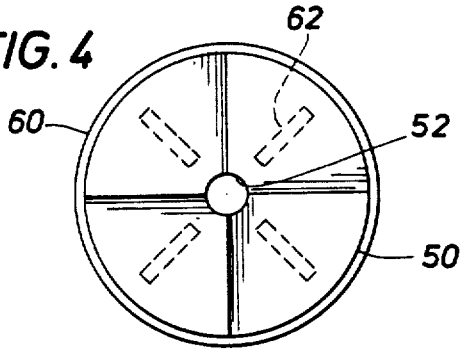
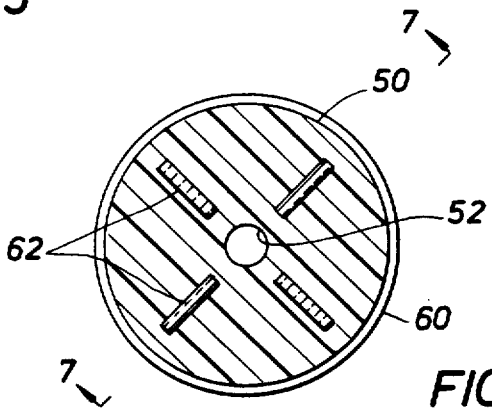
FIG. 6
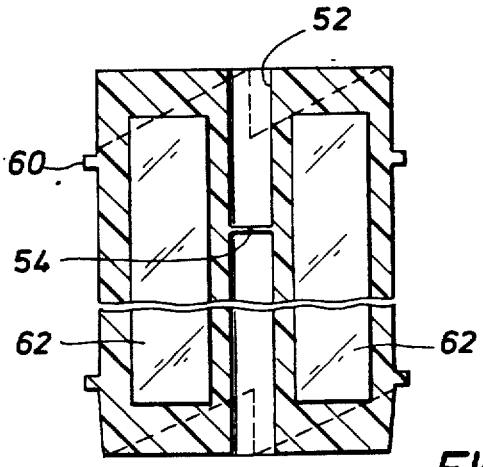
FIG. 7

DOWNHOLE CEMENTING TOOL ASSEMBLY

Matter enclosed in heavy brackets [ ] appears in the original patent but forms no part of this reissue specification; matter printed in italics indicates the additions made by reissue.

BACKGROUND OF THE DISCLOSURE

This invention relates to oil well drilling, particularly, to a downhole cementing tool assembly for directing a slurry of cement and water to a point down hole for cementing the well casing in the well bore.

Many related operations are involved to drill and complete a well. Initially, a casing program is developed on the basis of geophysical information relating to the drill site. The casing program typically provides for the installation of various sizes and types of casing to meet the objective of the drilling program. Upon completion of the drilling program and other preparatory activity, drilling of the well hole is begun. At various stages during the drilling process, casing is set in the well and cemented in place. Typically, a short string of pipe, conductor pipe, is set in the well. The conductor pipe extends from the surface a short distance into the formation. The conductor pipe is particularly useful where the ground is soft, as for example, in a swamp, marsh or offshore location. The conductor pipe may or may not be cemented in place as required. As drilling progresses, casing is set to protect the well. Casing prevents the contamination of fresh water in the upper zones of the formation being drilled and prevents water from entering the well from the surrounding formations. In addition, casing confines production of the well fluids to a particular formation or zone and provides a means of controlling formation pressure.

In a typical drilling program, as is well known in the prior art, various sizes of casing are set and cemented in the well bore. Surface casing, for example, has a smaller diameter than the conductor pipe and is set concentrically within the conductor pipe. The surface casing is set deep enough to protect the well from cave in of loose formations which are often encountered near the surface of the formation being drilled. Intermediate casing, set concentrically within the surface casing, seals off weak zones encountered during drilling to prevent loss of circulation, contamination of drilling fluid and to seal off producing zones which may exist above the bottom of the well. Production casing is the last casing set in the well. As each type of casing is set in the well, cement, usually in the form of a slurry comprising cement and water, is pumped down the casing and into the well bore. The cement is forced up around the external surface of the casing and permitted to set before drilling to further depths is commenced.

After the cement has set, the bottom of the well bore is completely sealed with the cement. Some cement extends up into the lower portion of the casing and must be subsequently drilled through upon continuation of drilling the well to a deeper depth. This process is continued with different size casing set and cemented at various depths in the formation. Upon reaching the production depth, production casing is set and cemented in the well bore. The production casing is perforated in the producing zone permitting the formation fluids to enter the production tubing and either flow to the surface or lifted to the surface in a known manner.

In the drilling of a well, drilling fluid is used to control or offset the formation pressures encountered during drilling of the well. Another important use of the drilling fluid is to remove the drill cuttings from the bottom of the well bore. Thus, during drilling, the well bore is filled with drilling fluid. While setting casing in the well bore, it is desirable to prevent the drilling mud from entering the casing while it is being lowered in the well. Typically, a float collar is inserted one or two joints above the bottom of the casing string, which float collar includes a check valve at the lower end thereof which permits fluid to pass downward through the casing but prevents fluid from passing upward into the casing. The float collar has the additional benefit of closing the bottom end of the casing string so that it floats or is buoyed in the drilling fluid during the decent of the casing string in the well bore, thereby decreasing the load upon the derrick. The float collar also prevents the back flow of cement during the cementing operation.

As the casing string is lowered in the well bore, the drilling fluid is displaced and forced out of the well bore. The drilling fluid flows out of the well bore in the annular space formed between the outside of the casing and the inner wall of the well. The casing string is empty above the float collar and once positioned in the well bore, a cement slurry is pumped into the casing. A plug is then positioned in the casing above the cement slurry and drilling fluid is pumped into the casing forcing the plug downward to compress or push the cement slurry through the bottom end of the casing string. Recall that the check valve in the float collar permits the cement slurry to pass downward through the casing out the lower end of the casing and up around the outside of the casing to thereby fill the annular space and cement the casing in the well bore. After the cement has set, the cement plug and float collar are drilled out and drilling of the well continues.

The above discussion is illustrative of drilling and cementing operations well known in the prior art. A problem encountered after the cementing operation has been completed, is removal of the cementing tool assembly so that drilling the well may be continued. The cementing tool assembly (wiper plug and cementing plug) is fabricated of frangible material, typically some type of resilient material such as rubber and is usually drilled out. However, since the wiper plug and cementing plug are loose in the casing above the float collar, they tend to rotate with the action of the rotating drill bit so that some difficulty is encountered in drilling through the cementing tool assembly. The cost of drilling is very expensive and therefore, it is desirable to drill through the cementing tool assembly as quickly as possible so that drilling the well may be continued with the least possible interruption.

The apparatus of the present invention overcomes the disadvantages associated with the prior art cementing tool assemblies by providing a locking mechanism on the lower end of both wiper plug and the cementing plug to prevent rotation of the cementing tool assembly and wiper plug within the well bore. In addition, the wiper plug and cementing plug of the present invention incorporate frangible internal cutters to aid in the breakdown of the cementing tool assembly so that it is quickly drilled through. The apparatus of the present invention overcomes these and other problems encountered when cementing casing of a well bore.

SUMMARY OF THE INVENTION

The apparatus of the invention is a cementing tool assembly comprising a float collar, cementing plug and wiper plug. The components of the assembly are provided with locking interface surfaces which upon engagement prevent the cement plug from rotating within the casing. The float collar is incorporated in the casing and is threaded thereto. The cement and wiper plugs are slidable within the casing. The cement and wiper plugs are cylindrical in shape and include a series of wiper bands extending thereabout. The wiper bands contact the internal surface of the casing and slide therealong to wipe the internal surface of the casing. The cement and wiper plugs include frangible internal cutters incorporated in the body of the plugs. The cementing plug includes an axial passage extending therethrough. The axial passage is interrupted by a diaphragm extending across the passage within the plug body.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

FIG. 3 is an exploded view of the cementing tool assembly of the present invention;

FIG. 4 is an end view of the upper locking interface of the cement plug of the invention;

FIG. 5 is an end view of the lower locking interface of the wiper plug of the invention;

FIG. 6 is a sectional view of the cement plug of the invention; and

FIG. 7 is a sectional view of the cement plug of the invention taken along line 7—7 of FIG. 6.

DETAILED DESCRIPTION OF THE PREFERRED EMBODIMENT

Figure 1:
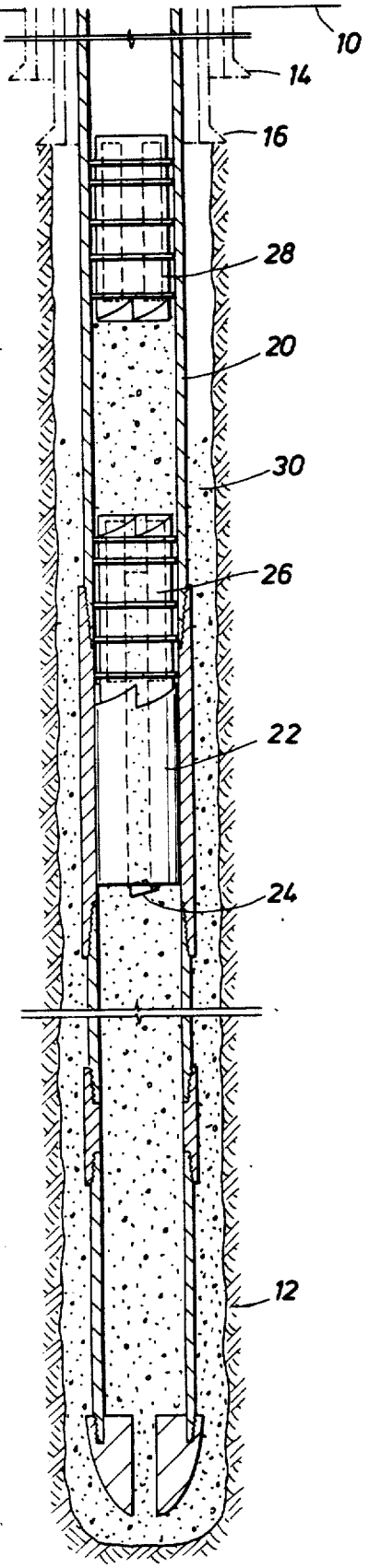
FIG. 1 is a sectional view of a well illustrating a cementing operation.

Attention is first directed to FIG. 1 of the drawings wherein a cased well is shown. The well extends from the surface 10 to a subterranean formation 12 some distance below the surface. The well is defined by a series of casing strings extending from the surface 10 to the formation 12. The casing strings are concentrically arranged within each other and extend to various depths into the formation. The conductor pipe 14 is the outermost casing string. Concentrically arranged within the conductor pipe 14 is the surface casing 16 which extends from the surface 10 to a depth deep enough to protect the well from cave in of loose formations which may be encountered near the surface 10. The production casing 20 extends from the surface 10 to the bottom of the well which terminates in the formation 12.

Figure 2:
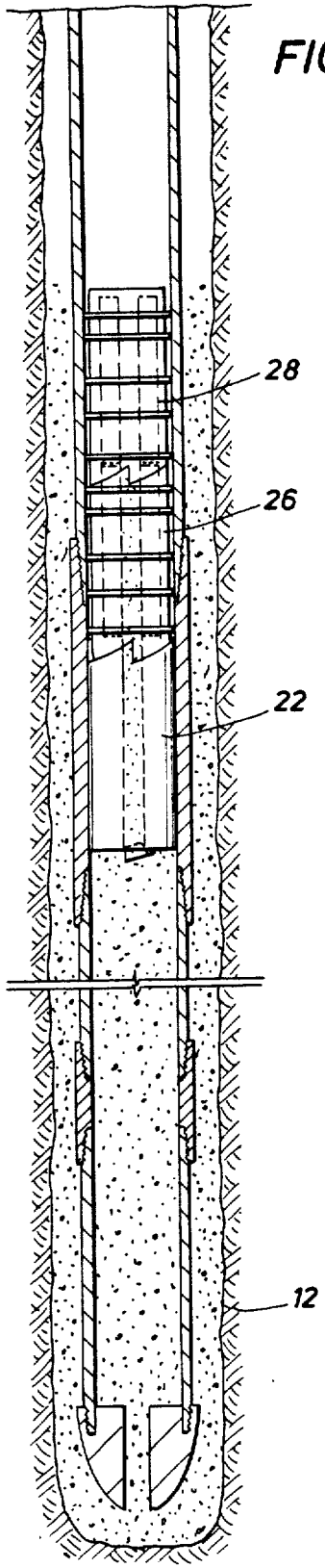
FIG. 2 is a sectional view of a well illustrating completion of the cementing operation.

In FIG. 1, the cementing operation is depicted in progress. It will be observed that a float collar 22 is incorporated in the production casing string 20 above the bottom thereof. The float collar 22 includes a check valve 24 which permits fluid to pass downward through the float collar 22. Any back pressure which may be encountered, tending to force the drilling fluid in the well upward, closes the check valve 24 and thereby prevents fluid from passing upward through the float collar 22. A cementing plug 26 is located above the float collar 22. The said casing string 20 is filled with a slurry of cement and water above the cement plug 26. A wiper plug 28 separates the cement slurry from drilling fluid in the upper portion of the casing string 20. To complete the cementing operation, the cement slurry is forced through the cementing plug 26 and float collar 22 and out the bottom of the casing string 20 and into the well bore. The cement extends up into the annular space 30 about the lower portion of the casing string 20. The cement is forced through the bottom of the casing string 20 by the pressure provided by the fluid above the wiper plug 28 forcing it downward and pushing the cement ahead of it as shown in FIG. 2. After the cement has set, the wiper plug and cementing plug may be drilled out if desired.

Referring now to FIG. 3, an exploded view of the cementing tool assembly is shown. The tool assembly of the present invention comprises a float collar 22, cementing plug 26 and wiper plug 28. The float collar 22 comprises a pipe section threaded at each end for incorporation into the casing string 20. The float collar 22 forms a part of the casing string 20 and is typically inserted one or two joints above the bottom of the casing string. In cross section, the float collar 22 is solid except for an axial passage 32 which extends through the float collar 22. The axial passage 32 is much smaller in diameter than the diameter of the casing string and is closed at the bottom of the float collar 22 by a check, flapper or other similar type valve 34. The upper end of the float collar 22 includes a locking interface for locking engagement with the lower end of the cementing plug 26. The locking interface comprises a plurality of upstanding perpendicular surfaces extending radially from the center of the float collar 22. The surfaces 36 are formed by cutting into the body of the float collar 22 and removing a portion thereof to form a recess, one edge of which is defined by a line 38. the line 38 defines a curved edge or juncture of an arched surface 40 which extends from an edge 42 of the perpendicular surface 36 toward the next adjacent surface 36, thereby defining a plurality of teeth extending radially from the center of the float collar 22.

The cementing plug 26 comprises a cylindrical body 50 formed of frangible material. The body 50 incorporates an axial passage 52 extending therethrough. The passage 52 is interrupted or closed by a diaphragm 54 which is rupturable at a preset differential pressure. The lower end of the body 50 is provided with a locking interface profiled to cooperate with the locking interface of the upper end of the float collar 22. When brought together, the locking interfaces of the cementing plug 26 and float collar 22 fit together so that the perpendicular faces 36 and 56 are in face-to-face contact and the curved surfaces 38 and 58 are complimentary and nestle one within the other. The locking interface at the opposite end of the cementing plug 26 is substantially identical to the locking interface of the float collar 22 for locking engagement with the locking interface of the lower end of the wiper plug 28.

In the position shown in FIG. 2, the cementing plug 26 and wiper plug 28 have been forced into engagement with the upper end of the float collar 22. In this position, the interlocking interface surfaces are in contact and form a nonrotatable plug assembly in the casing. The float collar 22 is threaded between casing pipe members to form the casing string 20 and therefore provides a stationery, nonrotatable anchor for the cement plug 26 and wiper plug 28.

Extending about the body 50 of the cementing plug 26 is a plurality of wiper bands 60 which wipe the inside surface of the casing string as the cement plug 26 is advanced therethrough. The wiper bands 60 are formed of the same resilient frangible material comprising the body 50 of the cement plug 26 and are integral therewith.

Referring now to FIG. 7, the body 50 of the cementing plug 26 is shown in sectional view. It will be observed that the body 50 is substantially circular in cross section. The wiper bands 60 project radially about the body 50 for contact with the interior surface of the surrounding casing. A plurality of frangible internal cutters 62 are spaced about the body 50. The frangible cutters 62 are elongate pieces of glass or other suitable frangible material which are embedded in the body 50 and extend substantially the full length thereof as best shown in FIG. 3. Glass is a convenient and inexpensive material from which to form the cutters; however, it is understood that other types of easily breakable material which form cutting edges upon breaking may also be used.

The wiper plug 28 is substantially identical to the cementing plug 26. However, the wiper plug 28 is solid in cross section and does not include an axial passage. The locking interface at the lower end of the wiper plug 28 is substantially identical to the locking interface at the lower end of the cementing plug 26 as previously mentioned. Likewise, the wiper plug 28 includes a plurality of wiper bands 72 extending thereabout for wiping the cement from the interior surface of the casing as the wiper plug is advanced toward the cement plug 26. The upper end 74 of the wiper plug 28 is ridged so as to provide a rough surface enabling the drill bit to initiate drilling through the cement tool assembly and eliminate slippage when drilling is resumed.

In operation, the casing string is lowered from the surface into the well bore displacing the drilling fluid in the well bore as the casing floats toward the bottom of the well. Centralizers are provided about the casing string to center the casing string within the well bore. Once the casing string is in position, the cement plug is placed in the casing string and a slurry of cement and water is pumped into the casing string behind the cementing plug 26. Thereafter, the wiper plug 28 is placed in the casing string so that the cement slurry is captured between the cementing plug 26 and the wiper plug 28. Drilling fluid is then pumped into the casing behind the wiper plug 28 forcing the cementing plug 26, cement slurry and wiper plug 28 down the casing string and into contact with the float collar 22. In FIG. 1, the cement slurry has been forced down to the float plug 22. Upon an increase in drilling fluid pressure, the diaphragm 54 in the cementing plug 56 ruptures permitting the cement slurry to the forced through the axial passages 32 and 52 and out the lower end of the casing string to fill the annular space about the casing string as shown in FIG. 2. A drill bit is thereafter lowered into the casing string and positioned above the wiper plug 28 for continuing the drilling process. The weight of the drill bit and drill string extending from the surface compresses the resilient body of the cementing plug 26 and the wiper plug 28. The frangible cutters 62 break under compression forming many jagged edges which cut into the resilient body of the cementing plug 26 and wiper plug 28. As the drill bit rotates, torque is transmitted through the wiper plug and cementing plug. The twisting action aids the action of the frangible internal cutters in cutting the bodies of the wiper and cementing plugs, and thereby quickly weakening the plugs. The action of the frangible cutters shreds the wiper and cementing plug bodies so that they quickly fragment and collapse and may be easily drilled out of the casing so the drilling of the well may proceed.

While the foregoing is directed to the preferred embodiments of the present invention, other and further embodiments of the invention may be devised without departing from the basic scope thereof, and the scope thereof is determined by the claims which follow.

What is claimed is:

1. A cementing apparatus for use in cementing a casing string in a well bore, comprising:
   (a) a float collar incorporated in the casing string, said float collar including a passage extending therethrough;
   (b) a cementing plug having a cylindrical body including an axial passage extending therethrough, said cementing plug body further including closure means extending across said axial passage;
   (c) a wiper plug having a cylindrical body including wiper means extending about said wiper plug body for wiping the casing as said wiper plug is advanced through the casing;
   (d) cooperative interlocking means located on said float collar, said cementing plug and said wiper plug for locking said cementing plug and said wiper plug to said float collar in a nonrotatable position; and
   (e) wherein said cementing plug and said wiper plug including frangible internal cutters embedded in said cementing plug and said wiper plug.

2. The apparatus of claim 1 wherein said frangible internal cutters comprise a matrix of frangible pieces embedded in said wiper plug and said cementing plug.

3. The apparatus of claim 2 wherein said closure means in said cementing plug comprises a rupturable diaphragm.

4. The apparatus of claim 3 wherein said cementing plug includes integral wiper means protruding radially outwardly from said body for engaging the surrounding casing.

5. The apparatus of claim 1 wherein said frangible internal cutters comprise elongate, rectangular shaped panes of glass embedded in said wiper plug and said cementing plug.

6. The apparatus of claim 1 wherein said interlocking means comprises a plurality of radially extending teeth formed on the ends of said float collar, said cementing plug and said wiper plug profiled for interlocking engagement to form a nonrotatable assembly in the casing string.

*7. A cementing apparatus for use in cementing a casing string in a well bore, comprising:*
   *(a) a float collar incorporated in the casing string, said float collar including a passage extending therethrough;*

*(b) a cementing plug having a cylindrical body including an axial passage extending therethrough, said cementing plug body further including closure means extending across said axial passage;*

*(c) a wiper plug having a cylindrical body including wiper means extending about said wiper plug body for wiping the casing as said wiper plug is advanced through the casing; and*

*(d) cooperative interlocking means located on said float collar, said cementing plug and said wiper plug for locking said cementing plug and said wiper plug to said float collar in a nonrotatable position,*

*said interlocking means comprising:*

*a plurality of upstanding substantially perpendicular surfaces extending radially around each end of said cementing plug; radially around one end of said wiper plug; and radially and interiorly around one end of said float collar,*

*said interlocking means on said float collar further comprising: a recess interiorly inserted around the body of said float collar, said recess defining a line having a curved juncture of an arched surface extending from an edge of the substantially perpendicular surface toward an adjacent surface, thereby defining a plurality of radially extending serrated projecting teeth;*

*said interlocking means on each end of said cementing plug further comprising: a line having a curved juncture of an arched surface extending from an edge of the substantially perpendicular surface toward an adjacent surface, thereby defining a plurality of radially extending serrated projecting teeth,* whereby, upon interlocking movement of one end of said cementing plug toward said float collar, said substantially perpendicular surfaces of the float collar and the cementing plug are in face-*to-face contact and said curved junctures are complimentarily nestled relative to one another.*

*8. The apparatus of claim 7 wherein said closure means in said cementing plug comprises a rupturable diaphragm.*

*9. A cementing apparatus for use in cementing a casing string in a well bore having a float collar incorporated in the casing string, said float collar including a passage extending therethrough, said apparatus comprising:*

*(a) a cementing plug having a cylindrical body including an axial passage extending therethrough, said cementing plug body further including closure means extending across said axial passage;*

*(b) a wiper plug having a cylindrical body including wiper means extending about said wiper plug body for wiping the casing as said wiper plug is advanced through the casing; and*

*(c) cooperative interlocking means located on said float collar, said cementing plug and said wiper plug for locking said cementing plug and said wiper plug to said float collar in a nonrotatable position,*

*said interlocking means comprising:*

*a plurality of upstanding substantially perpendicular surfaces extending radially around each end of said cementing plug; radially around one end of said wiper plug; and radially and interiorly around one end of said float collar,*

*said interlocking means on said float collar further comprising: a recess interiorly inserted around the body of said float collar, said recess defining a line having a curved juncture of an arched surface extending from an edge of the substantially perpendicular surface toward an adjacent surface, thereby defining a plurality of radially extending serrated projecting teeth;*

*said interlocking means on each end of said cementing plug further comprising: a line having a curved juncture of an arched surface extending from an edge of the substantially perpendicular surface toward an adjacent surface, thereby defining a plurality of radially extending serrated projecting teeth,*

*whereby, upon interlocking movement of one end of said cementing plug toward said float collar, said substantially perpendicular surfaces of the float collar and the cementing plug are in face-to-face contact and said curved junctures are complimentarily nestled relative to one another.*

* * * * *